United States Patent [19]

Uchioke et al.

[11] Patent Number: 5,444,485
[45] Date of Patent: Aug. 22, 1995

[54] CAMERA WITH TURRET LENS AND SOLID STATE IMAGE SENSOR

[75] Inventors: Keizo Uchioke; Katuo Asami; Takeshi Fujishiro; Naoki Takatori, all of Tokyo, Japan

[73] Assignee: Fuji Photo Film Co., Ltd., Kanagawa, Japan

[21] Appl. No.: 16,200

[22] Filed: Feb. 11, 1993

Related U.S. Application Data

[63] Continuation of Ser. No. 707,551, May 30, 1991, abandoned.

[30] Foreign Application Priority Data

| Jun. 4, 1990 | [JP] | Japan | 2-145970 |
| Jun. 12, 1990 | [JP] | Japan | 2-153001 |
| Jun. 12, 1990 | [JP] | Japan | 2-153002 |
| May 7, 1991 | [JP] | Japan | 3-101481 |

[51] Int. Cl.⁶ .................................. H04N 5/232
[52] U.S. Cl. ........................... 348/335; 348/340; 348/351; 348/358; 354/195.12
[58] Field of Search ............... 358/909, 225, 227; 359/699; 354/195.1, 195.11, 195.12, 286; H04N 5/225; 348/219, 335, 340, 345, 351, 357, 358, 360

[56] References Cited

U.S. PATENT DOCUMENTS

| 2,572,729 | 3/1949 | Jackson | 348/335 |
| 2,632,370 | 7/1951 | Shepard | 348/335 |
| 4,525,050 | 6/1985 | Ohashi | 354/195.12 |
| 4,529,283 | 7/1985 | Oshima | 354/195.12 |
| 4,558,367 | 12/1985 | Urata et al. | 358/227 |
| 4,609,269 | 9/1986 | Kamata | 354/149.11 |
| 5,005,038 | 4/1991 | Ogawa | 354/400 |
| 5,032,919 | 7/1991 | Randmae | 358/227 |
| 5,047,792 | 9/1991 | Asano | 354/149.11 |
| 5,086,312 | 2/1992 | Tanaka | 354/195.12 |
| 5,101,278 | 3/1992 | Itsumi et al. | 358/227 |
| 5,142,312 | 8/1992 | Suzuki | 354/164 |
| 5,166,716 | 11/1992 | Kawano | 354/195.1 |
| 5,172,235 | 12/1992 | Wilm et al. | 358/226 |

FOREIGN PATENT DOCUMENTS

2101447 4/1990 Japan ............... H04N 5/225

Primary Examiner—Wendy R. Greening
Attorney, Agent, or Firm—Sughrue, Mion, Zinn, Macpeak & Seas

[57] ABSTRACT

A camera in which a T lens and a wide lens are respectively mounted on their respective lens holders which can be freely rotated and the T and W lenses are rotated to thereby switch over the T and w lenses to each other. The T and W lenses are supported such that they are freely rotatable. A CCD reference plate, on which a CCD can be mounted, is inserted over a lens support shaft and the mutual positional accuracy between the lenses and CCD can be enhanced through the lens support shaft. Also, the switching of the T and W lenses is executed in link with the movement of a plate cam, which is movable in a direction perpendicular to the lens support shaft for the T and W lenses, and a cam portion provided in the plate cam is used to move the T and W lenses in the axial direction of the lens support shaft to thereby adjust the focusing of the lenses. Further, an iris plate having a small diaphragm diameter is inserted into the optical axis of the T lens only in a macro photography to thereby increase the depth of field so as to allow the focusing in the macro photography.

5 Claims, 7 Drawing Sheets

TELE POSITION (∞)

FIG. 5(B)

TELE POSITION (∞)

FIG. 6(A)

TELE POSITION (INTERMEDIATE)

FIG. 6(B)

TELE POSITION (INTERMEDIATE)

FIG. 8(A)

MACRO POSITION

FIG. 8(B)

MACRO POSITION

CAMERA WITH TURRET LENS AND SOLID STATE IMAGE SENSOR

This is a continuation of application Ser. No. 07/707/551 filed May 30, 1991 now abandoned.

BACKGROUND OF THE INVENTION

1. Field of the Invention

The present invention relates to a camera and, in particular, to an electronic still camera in which tele and wide lenses can be switched over to each other in actual use.

2. Description of the Related Art

Conventionally, there has been known an electronic still camera (which is disclosed in Japanese Patent Application No. 1-184019) in which a tele lens (T lens) and a wide lens (W lens) are mounted in a lens holder, the lens holder is rotatably supported on a lens support shaft, and the lens holder can be electrically rotated between a T lens using position and a W lens using position to thereby switch the T and W lenses to each other.

The above-mentioned lens support shaft is supported at the two ends thereof respectively by a lens mount base member and a mount cover member and, in the rear of the lens mount base member, a CCD reference plate with a CCD solid state image pick-up element (which is hereinafter referred to as CCD) on board is disposed in such a manner that the positions of the CCD reference plate can be adjusted at 3 points. Also, this camera is constructed such that a point of focus can be adjusted by inserting a parallel glass into the optical axis of a taking lens.

In general, in macro photographing, the depth of field becomes extremely shallow, thereby making focusing difficult. For this reason, conventionally, in the macro photographing, an iris is stopped down to thereby increase the depth of field so as to cover the focusing with the increased depth of field.

On the other hand, in an electronic still camera having an electronic shutter function, there is no need for variable stopping for adjustment of light quantity, because an electric charge accumulation time (that is, shutter speed), during which the light of an object to be photographed substantially enters the image pickup element, can be controlled electrically.

However, in the macro photographing, as described before, greater stopping-down is necessary than in an ordinary photographing so as to increase the depth of field. For this reason, a camera capable of macro photographing requires a variable diaphragm mechanism such as a rotary diaphragm adapted to vary stop values by rotating a disc with small and large stop apertures punched thereon, an iris diaphragm capable of varying successively aperture diameters, and the like.

In the above-mentioned conventional electronic still camera, the T and W lenses and the CCD are respectively arranged through the lens mount base member in such a manner that they have a constant positional relationship therebetween. Due to this, it is hard to adjust the position of the CCD. Also, as described before, the CCD reference plate must be constructed such that its positions can be adjusted at three points.

Also, the switching of the above-mentioned T and W lenses is performed by intermittently transmitting a rotational drive force from a motor through a triangular cam to the T and W lenses, while the advancing and retreating of the parallel glass is performed by transmitting a rotational drive force from the motor through a focus switching cam to the parallel glass while the T and W lenses are being stopped. In other words, the power transmission mechanism employed in the above conventional electronic still camera is complicated due to the fact that the switching of the T and W lenses and the advancing and retreating of the parallel glass plate are carried out by taking out the respective drive forces from a single motor by use of the triangular cam and the focus switching cam. Also, the parallel glass advancing and retreating method is not capable of successive focus adjustments and, when a multi-stage focus switching is performed, a plurality of parallel glass plates differing in thickness from one another must be prepared to switch these parallel glass plates to one another, which makes the parallel glass plates switching mechanism further complicated.

Further, in an electronic still camera having an electronic shutter function, mechanical elements are saved or simplified as much as possible to thereby reduce the size and weight of the camera as well as decrease the cost thereof. However, to add the above-mentioned macro photographing function to the camera, there is necessary a variable diaphragm mechanism such as a rotary stop diaphragm, an iris stop diaphragm and the like, resulting in the complicated structure and increase in costs.

SUMMARY OF THE INVENTION

The present invention aims at eliminating the drawbacks found in the above-mentioned electronic still cameras according to the prior art.

Accordingly, it is an object of the invention to provide a camera which is capable of positioning an image pickup element with respect to T and W lenses with high accuracy and also is easy to adjust the focusing of the T and W lenses.

It is another object of the invention to provide a camera which is capable of switching T and W lenses to each other in link with the movement of a plate came and is also capable of adjusting the focusing of the T and W lenses by use of the plate cam.

It is still another object of the invention to provide a camera which is capable of macro photographing by use of a simple stop diaphragm mechanism.

In order to attain the above objects, according to the invention, there is provided a camera in which T and W lenses are respectively disposed on their respective lens holders, the lens holders are rotatably supported on a lens support shaft mounted to a base member, and the lens holders can be rotated between a tele lens using position and a wide lens using position, characterized in that a reference plate for an image pickup element to be mounted thereon is inserted through the lens support shaft and mounted to the base member so as to be able to position the light receiving surface of the image pickup element at the image forming positions of the T and W lenses.

Also, according to the present camera, there is provided a plate cam which is arranged to move in a direction perpendicular to the lens support shaft, the lens holders are rotated in link with the movement of the plate cam to thereby switch the lenses to each other, and the lens holder is moved in the axial direction of the lens support shaft by the cam portion of the plate cam so as to adjust the focusing of the lenses.

Further, according to the present invention, there is provided a camera having an electronic shutter function to control a time for accumulation of electric charges into an image pickup element, characterized in that an iris plate can be inserted onto the optical axis of a taking lens only in macro photographing.

According to the invention, the reference plate for the image pickup element to be mounted thereon is inserted into the lense support shaft on which the lens holders are rotatably disposed, so that the mutual position relationship between the lenses and image pickup element can be maintained with high accuracy by means of the lens support shaft. Also, the switching of the T and W lenses is performed in link with the movement of the plate cam which is movable in a direction perpendicular to the lens support shaft for the T and W lenses, and the T and W lenses are moved in the axial direction of the lens support shaft by the cam portion of the plate cam to thereby adjust the focusing of the lenses. Further, a fixed diaphragm is employed in an ordinary photographing, the amount of light incident onto the image pickup element (the amount of the light of an object to be photo-electrically converted) is adjusted by an electronic shutter, and an iris plate having a small diaphragm diameter is inserted onto the optical axis of a taking lens only in the macro photographing to thereby increase the depth of field so as to allow the focusing of the lenses in the macro photography. The diaphragm mechanism used only to insert and draw out the iris plate can be constructed much more easily than a conventional variable diaphragm mechanism. The iris plate is provided for increasement of the depth of field rather than for adjustment of the light amount. The adjustment of the light amount is performed by a so called electronic shutter which controls the electric charge accumulation time in a CCD.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a camera according to the present invention with reference to the accompanying drawings.

Figure 1:
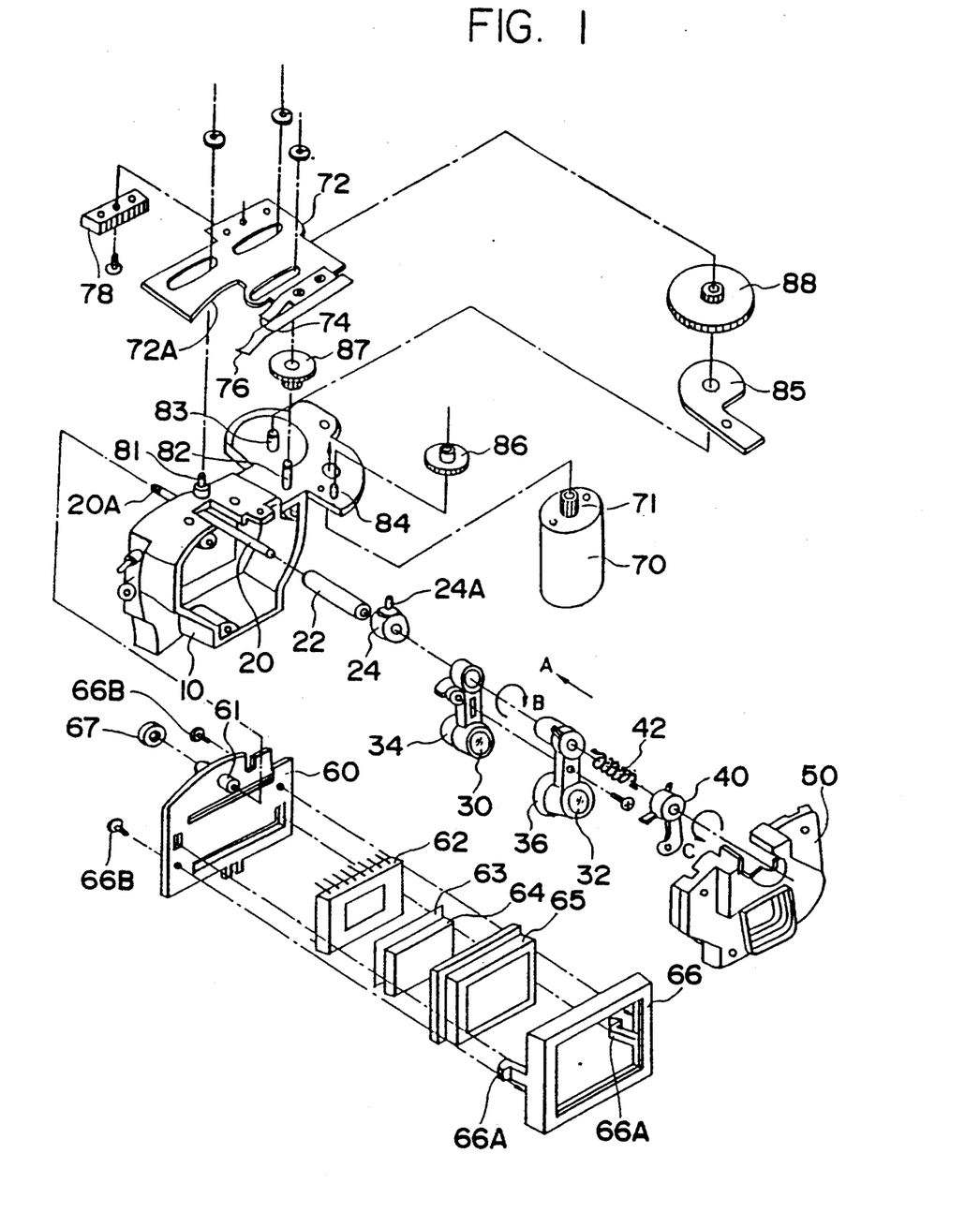
FIG. 1 is an exploded, perspective view of a small-sized T/W lens mount employed in a camera according to the invention.
Figure 2:
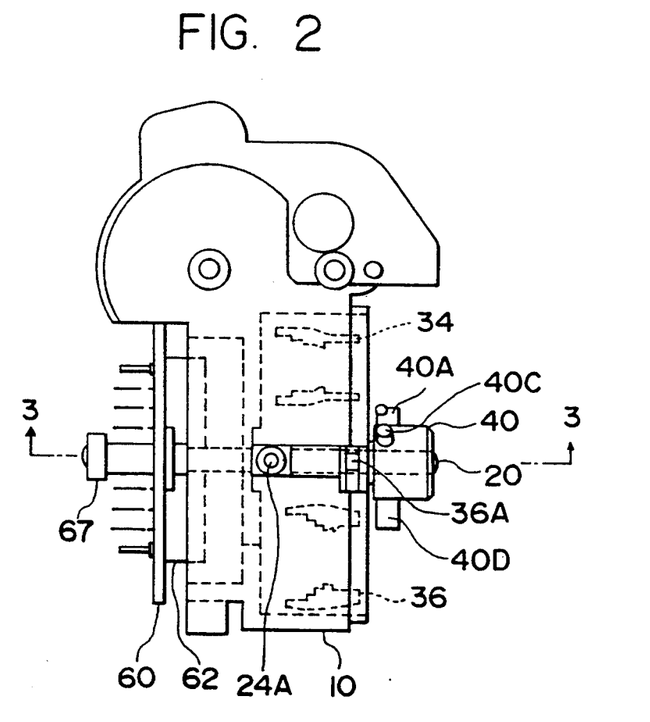
FIG. 2 is a plan view of a main body of the above small-sized T/W lens mount.
Figure 3:
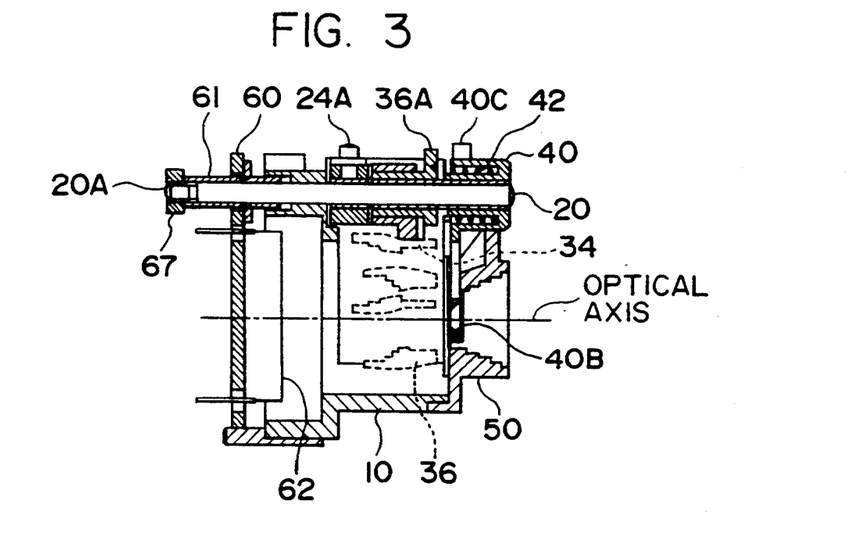
FIG. 3 is a section view taken along the line 3—3 in FIG. 2.

Referring to FIGS. 1 through 3, there is shown a small-sized T/W lens mount which comprises a main body, a CCD unit and a drive part. The lens mount main body mainly consists of a lens mount base member 10, a lens support shaft 20, a T lens holder 34 with a T lens 30 mounted thereto and a W lens holder 36 with a W lens 32 mounted thereto, an iris plate 40, and a mount cover member 50.

The lens support shaft 20, as shown in FIG. 3, is integrally fixed to the lens mount base member 10. A pipe member 22 is inserted over the lens support shaft 20. A cam follower member 24, the T lens holder 34 and the W lens holder 36 are inserted over the pipe member 22. The T lens holder 34 and the W lens holder 36 are previously moved in the axial direction thereof by use of an automatic collimator such that the image forming points of the T and W lenses 30 and 32 coincide with each other, and the mutual positions of the T and W lenses 30 and 32 are adjusted properly, before the T and W lens holders 34 and 36 are fixed onto the pipe member 22 by means of adhesives.

Also, the iris plate 40 is inserted over the above pipe member 22 through a compression coil spring 42. One end of the compression coil spring 42 is secured to the W lens holder 36 and the other end thereof is secured to the iris plate 40. And, the pipe member 22 is inserted over the lens support shaft 20 and the iris plate 40 is rotated by a given amount against the energizing force of the compression coil spring 42 and is pressed up to a given thrust position. After then, the mount cover member 50 is mounted onto the lens mount base member 10.

As a result of this, the T lens holder 34 and W lens holder 36 are rotatably mounted onto the lens support shaft 20 through the pipe member 22 such that it is freely slidable in the axial direction of the lens support shaft 20, and they are also energized in the axial direction thereof (namely, in a direction of an arrow A) by the compression coil spring 42. Also, the T lens holder 34 and W lens holder 36 as well as the iris plate 40 are spring energized respectively in mutually opposing directions (namely, in the directions of arrows B and C).

The above-mentioned CCD unit comprises a CCD reference plate 60, a CCD 62, a Mylar sheet 63, an optical low pass filter (OLPF) 64, an OLPF holder 65 and a CCD holder 66.

The CCD holder 66 is fixedly secured to the CCD reference plate 60 by-means of its claw portions 66A, 66A and screws 66B, 66B, whereby the CCD 62, Mylar sheet 63, OLPF 64 and OLPF holder 65 can be held between the CCD reference plate 60 and CCD holder 66. Also, a pipe member 61 is staked to the CCD reference plate 60 in such a manner that it intersects perpendicularly with the CCD reference plate 60.

The above-mentioned CCD unit is mounted from the back portion of the lens mount base member 10 in such a manner that the lens support shaft 20 is inserted over the pipe member 61 fixed to the CCD reference plate 60. Then, the CCD unit can be fixed by threadedly engaging a nut 67 with a threaded portion 20A formed in the lens support shaft 20 (see FIG. 3).

Also, there is interposed a compression coil spring (not shown) between the CCD reference plate 60 and lens mount base member 10, so that, by rotating the nut 67, the CCD unit can be moved in parallel to the axial direction of the lens support shaft 20. That is, by means of rotation of the nut 67, the focusing of the T and W lenses can be adjusted.

Next, description will be given below of the drive part for driving the T and W lenses and the like.

The drive part consists mainly of a DC motor 70, a plate cam 72, plate springs 74, 76 and a gear train which is used to transmit the driving force of the DC motor 70 to the plate cam 72.

On the lens mount base member 10, there are planted three guide pins 81, 82, 83 and a shaft 84. A position detecting base plate 85 is fitted over the guide pins 82 and 83, and also gears 87 and 88 are rotatably placed over the guide pins 82 and 83. A gear 86 is inserted over the shaft 84. After then, the plate cam 72 is slidably placed over the three guide pins 81, 82 and 83 respectively by means of three elongated bores.

The plate cam 72 includes a cam portion 72A with which a pin 24A of the cam follower member 24 can be brought into contact, and the plate springs 74, 76 and a rack 78 are secured to the plate cam 72 by use of a screw. The cam portion 72A moves the T and W lenses through the cam follower member 24 in the axial direction of the lens support shaft 20 to thereby switch the focusing positions of the T and W lenses in four stages, while the plate springs 74 and 76 respectively perform the switching of the T and W lenses and the insertion of the iris plate 40, which will be discussed in detail afterwards.

The DC motor 70 is secured to the lens mount base member 10 by means of a screw and it transmits its driving force from a gear 71, which is disposed on the output shaft of the motor, to the plate cam 72 through the above-mentioned reducing gears 86, 87, 88 and rack 78 to thereby move the plate cam 72 in a direction perpendicular to the lens support shaft 20.

Due to the fact that the guide pin 81 is planted adjacent to (preferably, just above) the lens support shaft 20, even when the direction of the movement of the plate cam 72 with respect to the lens support shaft 20 is not completely perpendicular to the lens support shaft 20 due to the variations of products, assembling errors and the like, the amount of the movements of the T and W lenses caused by the cam portion can be set within a desired error range. Also, on the lower surface of the gear 88, there is provided a brush (not shown) which can be brought into sliding contact with a position detecting pattern formed on the upper surface of the position detecting base plate 85, whereby the position of the movement of the plate cam 72 can be detected by a code signal which can be obtained from the above position detecting base plate 85.

Next, description will be given below of the switching of the focusing positions of the T and W lenses, the switching of the lenses, and the insertion of the iris plate.

Figure 4A:
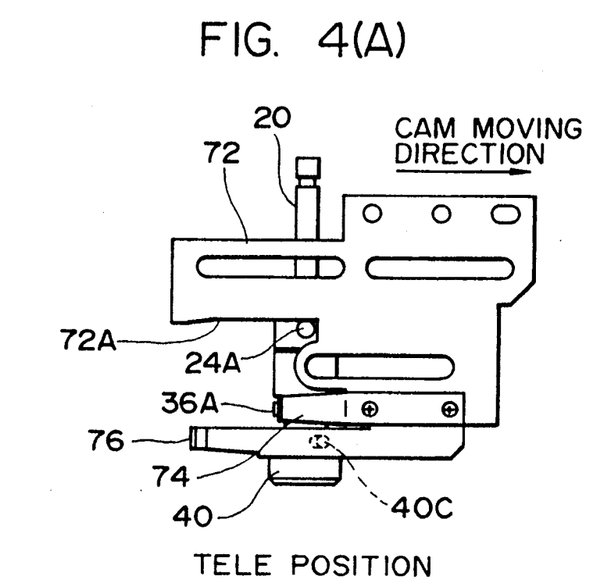
FIGS. 4(A) and (B) are respectively plan and front views of main portions of the small-sized T/W lens mount, showing its wide position.
Figure 4B:
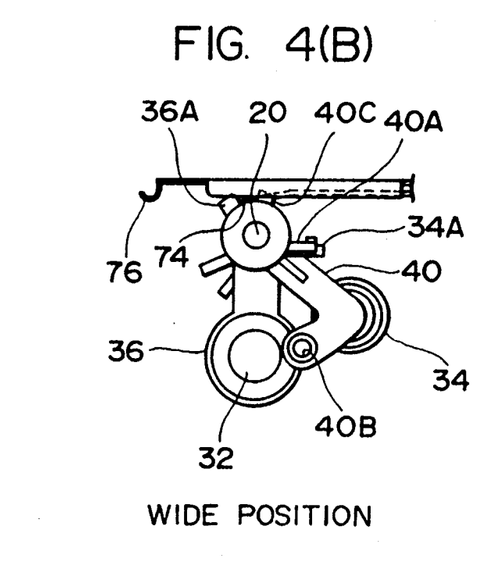

FIGS. 4(A) and (B) respectively illustrate a wide position condition, and the plate cam 72 is situated leftmost in FIG. 4. In this condition, in the T and W lenses, a projection 36A formed projectingly in the W lens holder is pressed by the leading end of the plate spring 74, and a stopper 34A is rotated counter-clockwise against the clockwise energizing force applied by the compression coil spring 42 (see FIGS. 1 and 3) until it comes into contact with the lens mount base member 10. As a result of this, the W lens 32 is moved to the W lens using position. On the other hand, the iris plate 40 is energized counter-clockwise by the compression coil spring 42, the stopper 40A is rotated to a position where it comes into contact with the lens mount base member 10, and the diaphragm hole 40B of the iris plate 40 is retreated from the lens optical system.

Figure 5A:
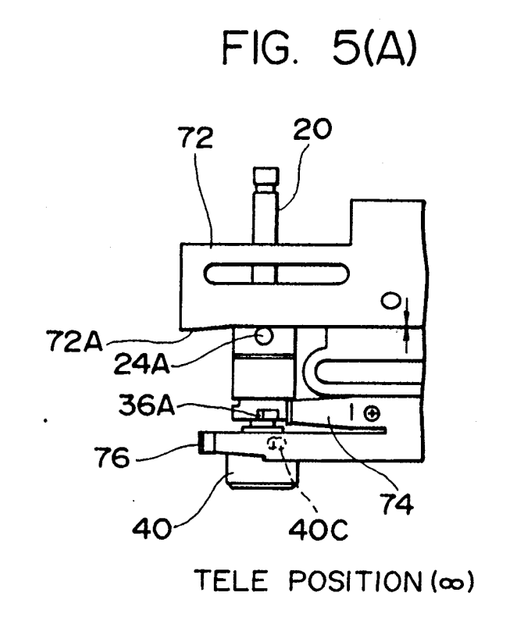
FIGS. 5(A) and (B) are respectively plan and front views of the main portions of the small-sized T/W lens mount, showing its tele (∞) position.
Figure 5B:
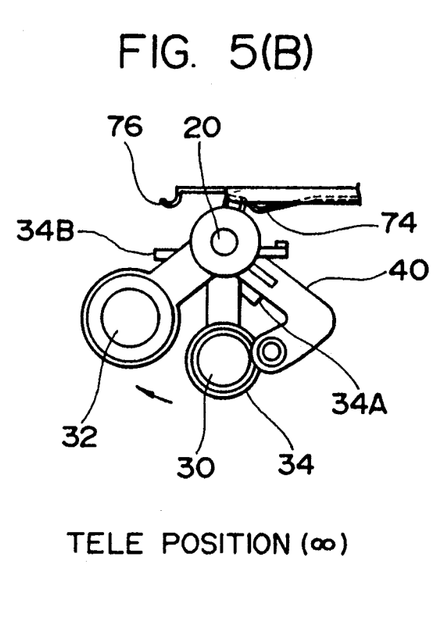

Now, FIGS. 5(A) and (B) respectively illustrate a tele position ($\infty$) condition, in which the plate cam 72 is moved a given amount from the wide position. In this condition, the pressing force applied to the T and W lenses by the plate spring 74 is removed and thus the T and W lenses are rotated to a position in which the stopper 34B can be brought into contact with the lens mount base member 10 due to the clockwise energizing force of the compression coil spring 42. As a result of this, the T lens 30 is moved to the T lens using position. It should be noted here that the iris plate 40 remains at its retreat position.

Also, the position in which the cam portion 72A of the plate cam 72 in contact with the pin 24A is the same as the wide position (the amount of the movement of the T and W lenses in the axial direction of their support shaft by the plate cam 72 is zero), so that the T lens 30 is in focus on an object to be photographed which is located at a distance.

Figure 6A:
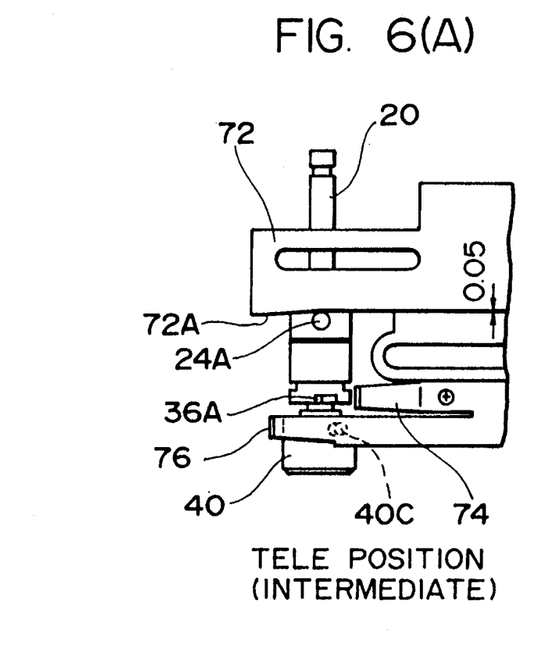
FIGS. 6(A) and (B) are respectively plan and front views of the main portions of the small-sized T/W lens mount, showing its tele (intermediate) position.
Figure 6B:
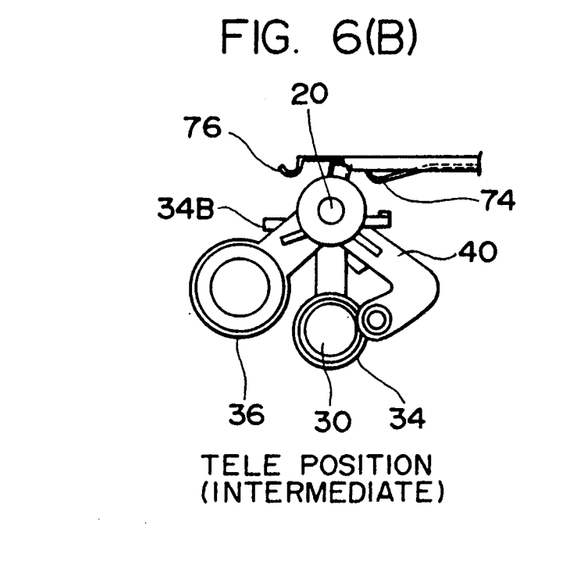

FIGS. 6(A) and (B) respectively illustrate a tele position (intermediate) condition, in which the plate cam 72 is moved a given amount toward right from the above-mentioned tele position ($\infty$). In this condition, the T and W lenses are drawn out 0.05 mm in the optical axis direction from the tele position ($\infty$) by the cam portion 72A of the plate cam 72 through the pin 24A, so that the T lens 30 is in focus on an object to be photographed which is located at an intermediate distance.

Figure 7A:
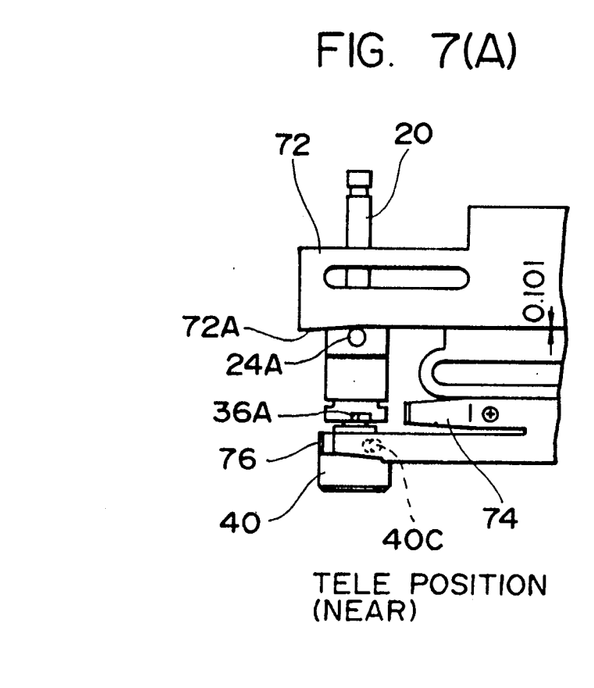
FIGS. 7(A) and (B) are respectively plan and front views of the main portions of the small-sized T/W lens mount, showing its tele (close) position; and, FIGS. 8(A) and (B) are respectively plan and front views of the main portions of the small-sized T/W lens mount, showing its macro position.
Figure 7B:
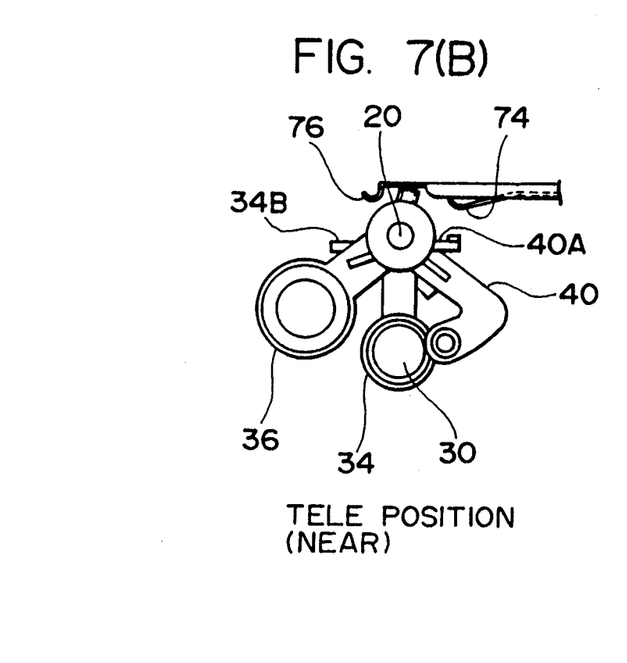

Also, FIGS. 7(A) and (B) respectively illustrate a tele position (near) condition, in which the plate cam 72 is moved a given amount toward right from the above-mentioned tele position (intermediate). In this condition, the T and W lenses are drawn out 0.101 mm in the optical axis direction from the tele position ($\infty$) by the cam portion 72A of the plate cam 72, so that the T lens 30 is in focus on an object to be photographed which is located at a near distance.

Figure 8A:
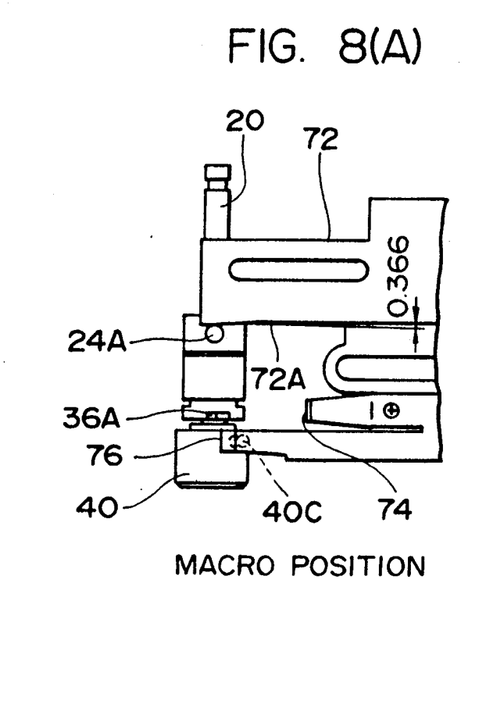
Figure 8B:
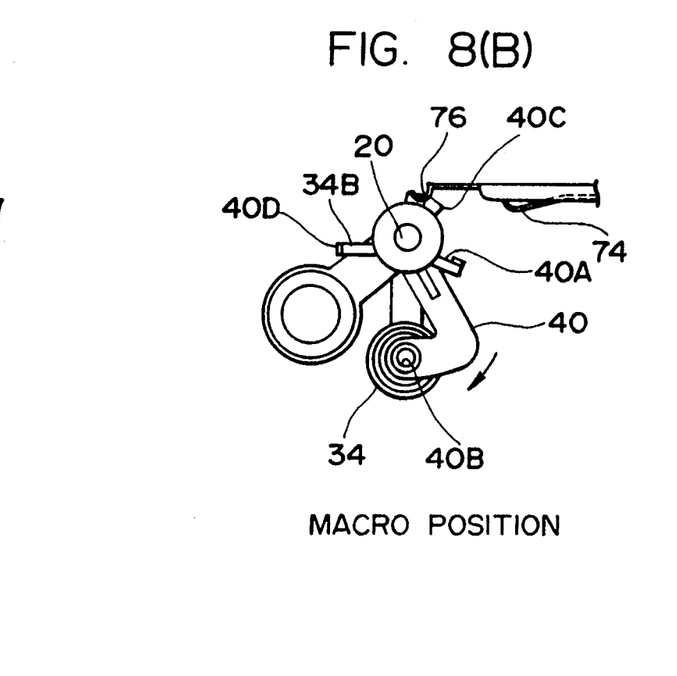

Now, FIGS. 8(A) and (B) respectively illustrate a macro position condition, in which the plate cam 72 is moved a given amount further right from the above-mentioned tele position (near). In this condition, the T and W lenses are drawn out 0.366 mm in the optical direction from the tele position ($\infty$) by the cam portion 72A of the plate cam 72 through the pin 24A.

On the other hand, the projection 40C provided projectingly in the iris plate 40 is hooked by the leading end of the plate spring 76 and the iris plate 40 is rotated clockwise until the stopper 40D is brought into contact with the lens mount base member 10 against the counterclockwise energizing force of the compression coil spring 42. As a result of this, the iris plate 40 is inserted to a predetermined position and the center of diaphragm bore 40B in the iris plate 40 comes onto the optical axis.

In other words, in the macro position, the T lens 30 is drawn out 0.366 mm in the optical axis direction from the tele position ($\infty$), and the iris plate 40 having a small diaphragm diameter is inserted to thereby increase the depth of field so as to be able to provide a close-up photography.

The iris plate 40 is used to increase the depth of field rather than to control the amount of light, and the control of the light amount is performed by a so called electronic shutter which is adapted to control the electric charge accumulation time in the CCD 62.

As has been described heretofore, according to a camera of the present invention, the reference plate, onto which the image pickup element is mounted, is inserted over the lens support shaft to which the lens holders are inserted, so that the mutual position accuracy between the lenses and image pickup element can be enhanced and also the focusing of the lenses can be adjusted with ease. Also, both the switching of the T and W lenses and the adjustment of the focusing thereof can be performed by moving a single cam plate. Further, due to the fact at least one of the plurality of the guide pins provided in the plate cam is disposed adjacent to the lens support shaft, the focusing adjustments by the plate cam can be carried out with a desired accuracy even if the accurate perpendicularity of the plate cam is not obtained. Further, since the iris plate having a small diaphragm diameter is inserted only in the macro photography, the diaphragm mechanism can be simplified.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera in which lens holders respectively having a tele lens and a wide lens mounted thereto are disposed rotatably on a lens support shaft provided in a base member and the lens holders can be rotated between a tele lens using position and a wide lens using position, characterized in that a reference plate, on which a solid state image sensor is mounted, is inserted over said lens support shaft and is mounted to said base member, so that the light receiving surface of said solid state image sensor perpendicularly intersects said lens support shaft and can be positioned at the image forming positions of said tele and wide lenses, wherein respective optical axes of said tele and wide lenses are parallel to said lens support shaft, and wherein said tele and wide lenses can be positioned separately and independently from said solid state image sensor.

2. A camera as set forth in claim 1, wherein said reference plate is moved in parallel to the axial direction of said lens support shaft by a nut threadedly engageable with an external threaded portion formed in said lens support shaft to thereby be able to position said light receiving surface of said solid state image sensor at the image forming positions of said tele and wide lenses.

3. A camera comprising:
a base member including a lens support shaft;
a pair of lens holders respectively having a tele lens and a wide lens, said tele lens and wide lens being disposed on said lens support shaft and rotatable between a tele lens using position and a wide lens using position, respective optical axes of said tele and wide lenses being parallel to said lens support shaft;
a reference plate including an image pickup element comprising a solid state image sensor (CCD), said reference plate being inserted over said lens support shaft and mounted to said base member, so that a light receiving surface of said solid state image sensor perpendicularly intersects said lens support shaft;
a first positioning means for positioning said reference plate at image forming positions of said tele lens and said wide lens; and
a second positioning means for positioning said tele and wide lenses along said lens support shaft separately and independently from said reference plate.

4. A camera comprising:
a base member including a lens support shaft;
a pair of lens holders respectively having a tele lens and a wide lens, said tele lens and wide lens being disposed on said lens support shaft and rotatable between a tele lens using position and a wide lens using position, respective optical axes of said tele and wide lenses being parallel to said lens support shaft;
a reference plate including an image pickup element comprising a solid state image sensor (CCD), said reference plate being inserted over said lens support shaft and mounted to said base member, so that a light receiving surface of said solid state image sensor perpendicularly intersects said lens support shaft;
a first positioning means for positioning said reference plate at image forming positions of said tele lens and said wide lens; and
a second positioning means for positioning said tele and wide lenses along said lens support shaft separately and independently from said reference plate.
wherein said first positioning means comprises a nut threadably engaged with an external threaded portion formed in said lens support shaft, such that said reference plate can be moved in parallel to an axial direction of said lens support shaft by rotating said nut, thereby allowing said solid state image sensor to be positioned at said image forming positions of said tele lens and said wide lens.

5. A camera as set forth in claim 4, wherein said second positioning means comprises a plate cam which is movable in a direction perpendicular to said lens support shaft, said lens holders being movable in the axial direction of said lens support shaft by a cam portion of said plate cam.

* * * * *